June 19, 1934.                C. COSMAN                 1,963,226
                              RUBBER CORD
                          Filed April 6, 1931

Inventor:
Claus Cosman
By
   Attorney.

Patented June 19, 1934

1,963,226

UNITED STATES PATENT OFFICE 1,963,226

RUBBER CORD

Claus Cosman, Elberfeld, Germany

Application April 6, 1931, Serial No. 528,130
In Germany May 27, 1930

5 Claims. (Cl. 96—26)

This invention relates to an elastic braid such as commonly utilized for knickers, for garters and similar articles and which contains rubber threads braided in longitudinally, so-called "middle ends". The braids produced heretofore had comparatively smooth edges and surfaces. Such braids become comparatively easily exposed and will easily slide when worn in that they easily slide back and forth in the article of dress. Particularly the edges of the braids will suffer thereby.

In the elastic braid, according to the present invention, the above mentioned disadvantage is overcome by providing the longitudinal marginal rubber threads and/or inner rubber threads with an indentation. This indentation may be produced by twisting around the marginal rubber threads, cotton or other threads, and braiding the rubber threads covered in this manner, while being maintained under tension, by which the ridges formed by the twisted threads are removed from one another, into the braid or band. Hereby the intervening spaces on the rubber threads between the several turns of twisted threads and the ridges on the rubber threads are covered alternately by the braided threads. The braided threads cover, therefore, alternately the bare rubber thread between two neighboring turns of twisted threads and the turns themselves. This results in an indentation of the marginal rubber threads and by that in an indented or pearl edge of the braid. Other individual rubber threads may also be covered by twisting with cotton or other threads in order to also indent and to form indented ribs between the edges of the braid. In special cases and the marginal rubber threads may consist of bare rubber.

The rubber threads may with advantage be covered with a simple twist in spiral form, i. e. in only one direction, whereby a finely indented edge (pearl edge) is produced. Since the rubber threads are worked into the braid under tension, the braiding material transversally covers the spiral twist of at least the marginal rubber threads which in this way produce a finely indented edge. The covered rubber threads combined with the pearl edges impart considerably increased strength and durability to the braid. The covered rubber threads are furthermore protected against any external detrimental influences, so that considerably greater durability of the marginal rubber threads, which are subjected to the greatest strain, is assured.

Moreover, the indented edge (pearl edge) of the braid has the beneficial effect that the braid when worn in a garment cannot be easily displaced and keeps in its position, which fact is particularly important in such cases where definite plaits have to be maintained in a garment by means of an elastic braid.

Covered elastic threads have already been used for the manufacture of elastic textile articles, but these were so covered, that is, they were manufactured in such a manner, that the new desirable indented edge formation, which is the main characteristic of the present invention, could not be made.

The accompanying drawing shows an example of the elastic braid according to the invention.

Figure 1:
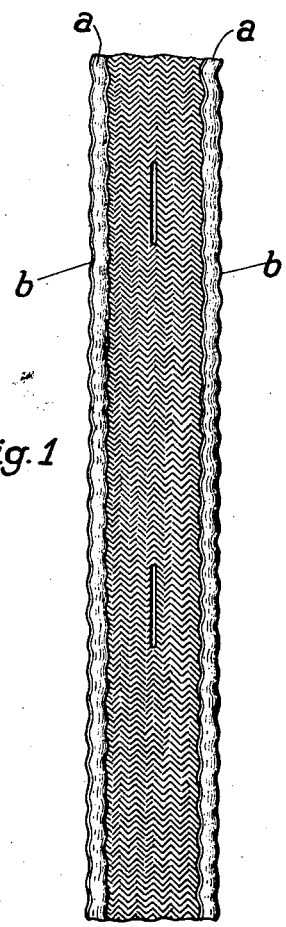
Fig. 1 shows the braid manufactured in the described manner in which $a$ represents the marginal threads and $b$ indented edge.
Figure 2:
Fig. 2 shows a thread $c$ covered by a twist $d$ in spiral form.

What I claim is:

1. In an elastic rubber braid, longitudinal marginal and inner rubber threads and transversal braiding threads, covering threads twisted helically around the marginal rubber threads forming intervening spaces on the rubber threads between the several turns of twisted threads, ridges formed by the twisted threads, a number of the transversal braiding threads covering the bare marginal rubber threads between the ridges formed by the twisted threads, and a number of the transversal braiding threads covering the ridges formed by the twisted threads, thereby forming indented edges on the braid.

2. In an elastic rubber braid, longitudinal marginal and inner rubber threads and transversal braiding threads, covering threads twisted helically around the inner rubber threads forming intervening spaces on the rubber threads between the several turns of twisted threads, ridges formed by the twisted threads, a number of the transversal braiding threads covering the bare inner rubber threads between the ridges formed by the twisted threads and a number of the transversal braiding threads covering the ridges formed by the twisted threads, thereby forming indented ribs between the edges of the braid.

3. In an elastic rubber braid, longitudinal marginal and inner rubber threads and transversal braiding threads, covering threads twisted helically around the marginal and the inner rubber threads forming intervening spaces on the rubber threads between the several turns of twisted threads, ridges formed by the twisted threads, a number of the transversal braiding threads covering the bare marginal and the inner rubber threads between the ridges formed by the twisted threads, and a number of the transversal braiding threads covering the ridges formed by the twisted threads, thereby forming indented edges on the braid and indented ribs between the edges.

4. In a method for manufacturing elastic rubber braids, comprising twisting covering threads helically around marginal and inner rubber threads, and braiding the covered rubber threads while being maintained under tension with inner rubber threads by transversal braiding threads, thereby forming indented edges on the braid and indented ribs between the edges of the braid.

5. A braided elastic band comprising a plurality of longitudinal and parallel rubber threads, a plurality of parallel transverse threads of a textile material arranged alternately crosswise over and under the longitudinal thread, a covering thread around at least the longitudinal threads at the edges of the band in a simple twist in only one direction, said twist forming a spiral winding on the longitudinal threads, said transverse threads being provided in groups alternately on the windings of the twist and on the bare portions of the edge threads lying therebetween, and the edge threads forming ridges over the twisted threads between indentations, thereby forming fine toothed edges on the band.

CLAUS COSMAN.